(12) United States Patent  
Sivaramakrishnan et al.

(10) Patent No.: US 7,777,943 B2  
(45) Date of Patent: Aug. 17, 2010

(54) ASTROMETRY AND PHOTOMETRY WITH CORONAGRAPHS

(75) Inventors: Anand Sivaramakrishnan, Huntington, NY (US); Ben R Oppenheimer, New York, NY (US)

(73) Assignee: American Museum of Natural History, New York, NY (US)

( * ) Notice: Subject to any disclaimer, the term of this patent is extended or adjusted under 35 U.S.C. 154(b) by 362 days.

(21) Appl. No.: 11/712,613

(22) Filed: Mar. 1, 2007

(65) Prior Publication Data

US 2008/0212219 A1 Sep. 4, 2008

(51) Int. Cl.
*G02B 23/00* (2006.01)
(52) U.S. Cl. ............ 359/399; 359/400; 356/124.5
(58) Field of Classification Search .......... 359/399–430
See application file for complete search history.

(56) References Cited

U.S. PATENT DOCUMENTS 4,358,681 A * 11/1982 Ando ...................... 250/324
5,249,080 A * 9/1993 Watson et al. ............ 359/601
5,365,317 A * 11/1994 Folkins et al. ............ 399/169
5,450,352 A * 9/1995 Ftaclas et al. ............ 356/124.5
7,471,435 B2 * 12/2008 Modavis ................... 359/227

OTHER PUBLICATIONS

Sivaramakrishnan et al, "Astrometry and Photometry with coronagraphs", the Astrophysical Journal, 647:620-629, Aug. 10, 2006.*

* cited by examiner

*Primary Examiner*—Thong Nguyen
(74) *Attorney, Agent, or Firm*—Davidson, Davidson & Kappel, LLC

(57) ABSTRACT

In a first exemplary embodiment of the present invention, an optical device comprises a telescope, a coronagraph device coupled to the telescope and having a focal plane occulting mask to provide a coronagraphic image, and a reticulate grid element arranged in a light path propagated through the telescope, at a location relative to the coronagraphic image, to create controlled fiducial spots in the coronagraphic image.

9 Claims, 4 Drawing Sheets

ASTROMETRY AND PHOTOMETRY WITH CORONAGRAPHS

BACKGROUND OF THE INVENTION

In modern astronomy, an important activity is the search for and study of exoplanets. An exoplanet is a planet in orbit around a star other than the sun. A difficulty encountered in the exoplanet study effort is the fact that the star is significantly brighter and larger in size than any exoplanet in orbit around the star. Distortions of the star image further complicate exoplanet study. For example, a point spread function (PSF) of an optical system is the irradiance distribution on a recorded image that results from a single point source in object space. A star in space is so far from earth, that it appears as a point to an earthbound telescope, or even to a telescope in orbit around the earth. However, due to inherent aberrations in the optics of a telescope, the image of the point source comprising the star, is spread over a finite area of a sensor receiving and recording the image from the optics of the telescope. Thus, a bright star whose image is distorted by PSF, presents significant difficulties to an accurate and correct study of an exoplanet orbiting the star.

One solution that is of particular benefit in exoplanet exploration and study is the coronagraph. A coronagraph is a telescopic attachment designed to block out the direct light of a star. An occulting mechanism is placed at the focal and other planes of the telescope to prevent light from the star from impinging upon downstream optical sensor elements of the telescope. Thus, the light intensity of the star does not completely obscure an exoplanet, thereby facilitating study of the exoplanet.

However, a further difficulty arises from the use of a coronagraph when study of an exoplanet is desired in respect of astrometry and photometry. Astrometry concerns the analysis of stars and other celestial bodies in terms of their distances and movements. Accurate relative astrometry between a star and an exoplanet in orbit about the star or the extended disk structure around the star, is important to an understanding of physical association between these celestial objects. Confirmation, by means of astrometric techniques, of such factors as common proper motion and common parallax, provides a basis for determination of orbital parameters and observation of disk structure quantitatively. Photometry is a technique of astronomy concerned with the measurement of flux, or intensity of the electromagnetic radiation of an astronomical object. Relative photometry between a star and objects in orbit around the star is useful in studies of disk and/or exoplanet physics and chemistry.

However, a perfect coronagraph operates to completely obscure the image of the PSF of a star. Thus, measurements of the intensity and location of a star, for use in astrometry and photometry, are typically either not possible or difficult, while using a coronagraphic image. Techniques have been proposed, for example, extreme adaptive optics (ExAO), for analysis and study of phenomena such as exoplanets, however, the proposed techniques are complex and difficult to implement.

SUMMARY OF THE INVENTION

The present invention provides a new and improved method and device for creating a coronagraphic image suitable for use in astrometry and photometry.

In a first exemplary embodiment of the present invention, an optical device comprises a telescope, a coronagraph device coupled to the telescope and having a focal plane occulting mask to provide a coronagraphic image, and a reticulate grid element arranged in a light path propagated through the telescope, at a location relative to the coronagraphic image, to create controlled fiducial spots in the coronagraphic image.

In a second exemplary embodiment of the present invention, an optical device comprises a mechanism for propagating a beam of light through a path, a coronagraph device to provide a coronagraphic image as a function of the beam of light and a reticulate grid element arranged in the light path, to create controlled fiducial spots in the coronagraphic image.

In a third exemplary embodiment of the present invention, a method is provided for controlling a beam of light. The method of the present invention includes the steps of propagating the beam of light through an optical device, utilizing a coronagraph device to provide a coronagraphic image as a function of the beam of light and utilizing a reticulate grid element to create controlled fiducial spots in the coronagraphic image.

In a fourth exemplary embodiment of the present invention, a grid element is provided. The grid element comprises a reticulate grid element, arranged for use in an optical device comprising a telescope, and further arranged to be in a light path propagated through the telescope, at a location relative to a recorded image, to create controlled fiducial spots in the image. The telescope can further include a coronagraph device coupled to the telescope and having a focal plane occulting mask to provide a coronagraphic image.

In a fifth exemplary embodiment of the present invention, a method is provided for controlling a beam of light. The method of the present invention includes the steps of propagating the beam of light through an optical device, and utilizing a reticulate grid element to create controlled fiducial spots in an image recorded by the optical device.

In a sixth exemplary embodiment of the present invention, a method is provided for controlling a beam of light, comprising the steps of propagating the beam of light through a device and utilizing a reticulate grid element to create a controlled satellite beam as a function of the beam of light.

In a seventh exemplary embodiment of the present invention, a grid element is provided. The grid element comprises a reticulate grid element for use in an optical device, and arranged to be in a light path propagated through the optical device, to create a satellite beam of a beam of light.

In additional exemplary embodiments of the present invention, additional steps are implemented to utilize the created fiducial spots in one of an astrometric study and a photometric study. The term optical device is used to designate any device arranged to propagate and/or focus a beam of electromagnetic waves, including, for example, a laser beam.

DETAILED DESCRIPTION OF THE PREFERRED EMBODIMENTS

Figure 1:
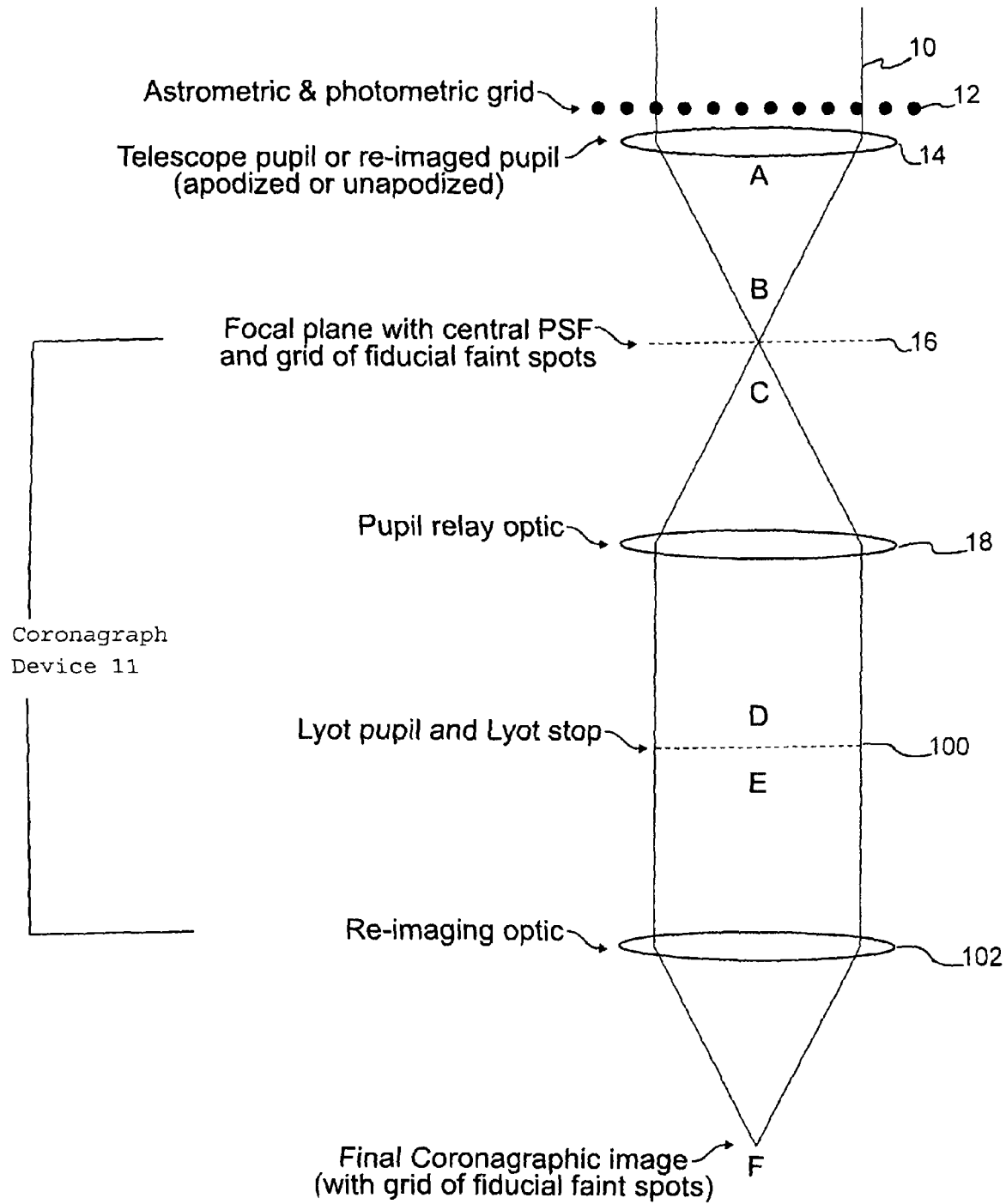
FIG. 1 is a schematic diagram of a telescopic imaging device including a coronagraph device and a reticulate grid element according to a feature of the present invention.

Referring now to the drawings, and initially to FIG. 1, there is shown a schematic diagram of a telescopic imaging device including a coronagraph device 11 and a reticulate grid element 12, through which a beam of light 10 is propogated, according to an exemplary embodiment of the present invention. The beam of light 10 is propagated through a path within a telescope, through a reticulate grid element comprising a grid of wires 12, to a telescope pupil 14. The grid of wires 12 overlies the pupil 14 such that the beam of light 10 is transmitted through the wires of the grid 12 before transmission through the pupil 14. The pupil 14 is a lens arranged to focus the beam of light 10, as emitted from the pupil 14, at A, to a focal plane 16, at B. The image at the focal plane 16 has a central PSF, corresponding to, for example, a star being observed, and caused by inherent aberrations in the optics of the telescope, as described above.

Moreover, according to a feature of the present invention, the image at the focal plane 16 further includes a pattern of fiducial faint spots, caused by the effects upon the beam of light 10 by the grid element 12, as the light beam 10 is propagated through the reticulate grid of wires 12. The grid design relies upon a Fraunhofer approximation of Fourier optics, whereby a periodic grid of, for example, wires, with a preselected width and spacing of the wires in the pupil plane, (in front of an occulting focal plane mask of a coronagraph) produces satellite beams of the beam of light 10, that are focused to create fiducial images, typically in the form of satellite spots representative of the star corresponding to the beam 10, at known locations in an image, relative to the image of the star. The fiducial spots provide a set of indicators or reference points within the image to pinpoint the location of the observed star, as will be described below.

Thus, an object such as an exoplanet can be related to and/or measured against the pinpointed location in astrometric and photometric studies, even after removal of the central PSF, in a coronagraph. Moreover, the grid 12 can be used to remove a controlled fraction of power from a collimated beam (via the satellite beams) in order to measure the power of the beam 10. The satellite beams or spots can also be used in a determination of the direction of the beam 10, or to steer the beam 10, via the angular orientation of the grid element, as will be explained in respect of FIG. 3.

Figure 2:
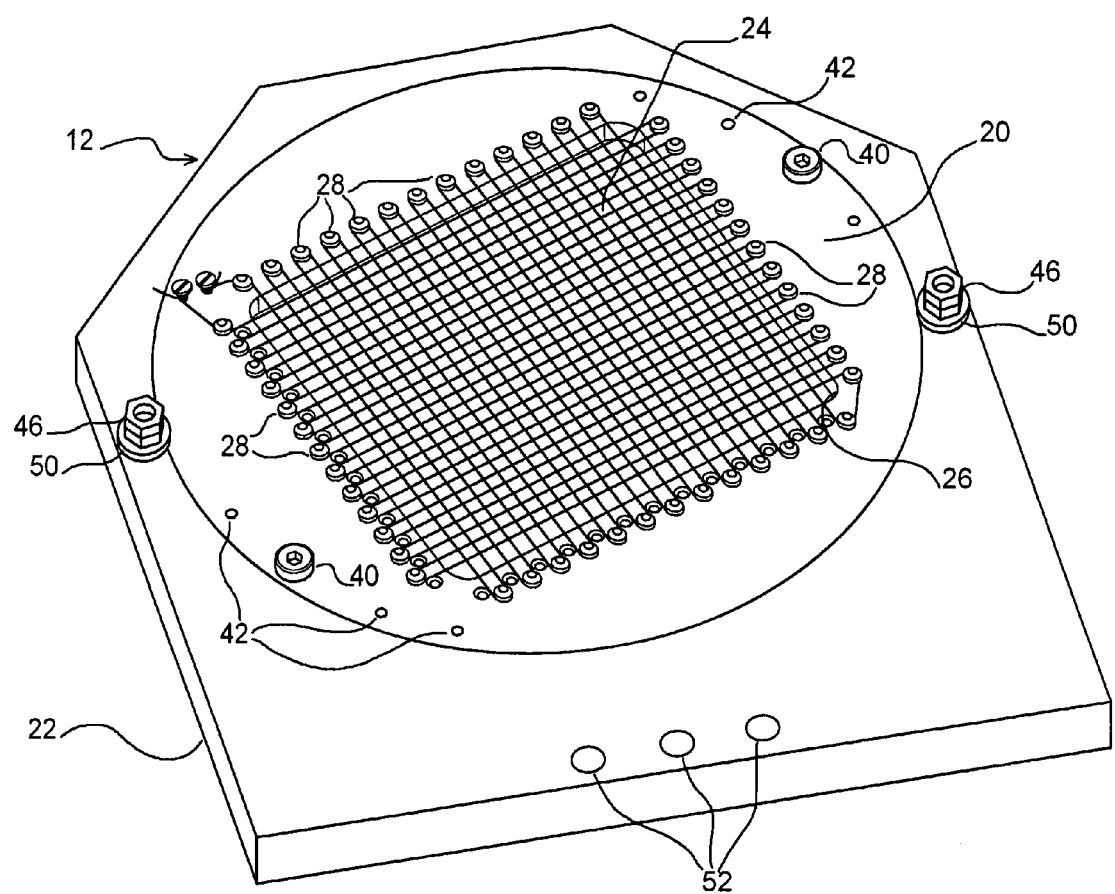
FIG. 2 is a front view of the reticulate grid element of FIG. 1.

Referring to FIG. 2, there is shown a front view of the reticulate grid of wires 12 of FIG. 1. The grid of wires 12 comprises a rotatable grid element 20 mounted in a main support plate 22. A reticulate grid is formed by a wire 24a wrapped to form a grid of wires 24 extending across an opening 26 formed in the rotatable grid element 20.

Figure 3:
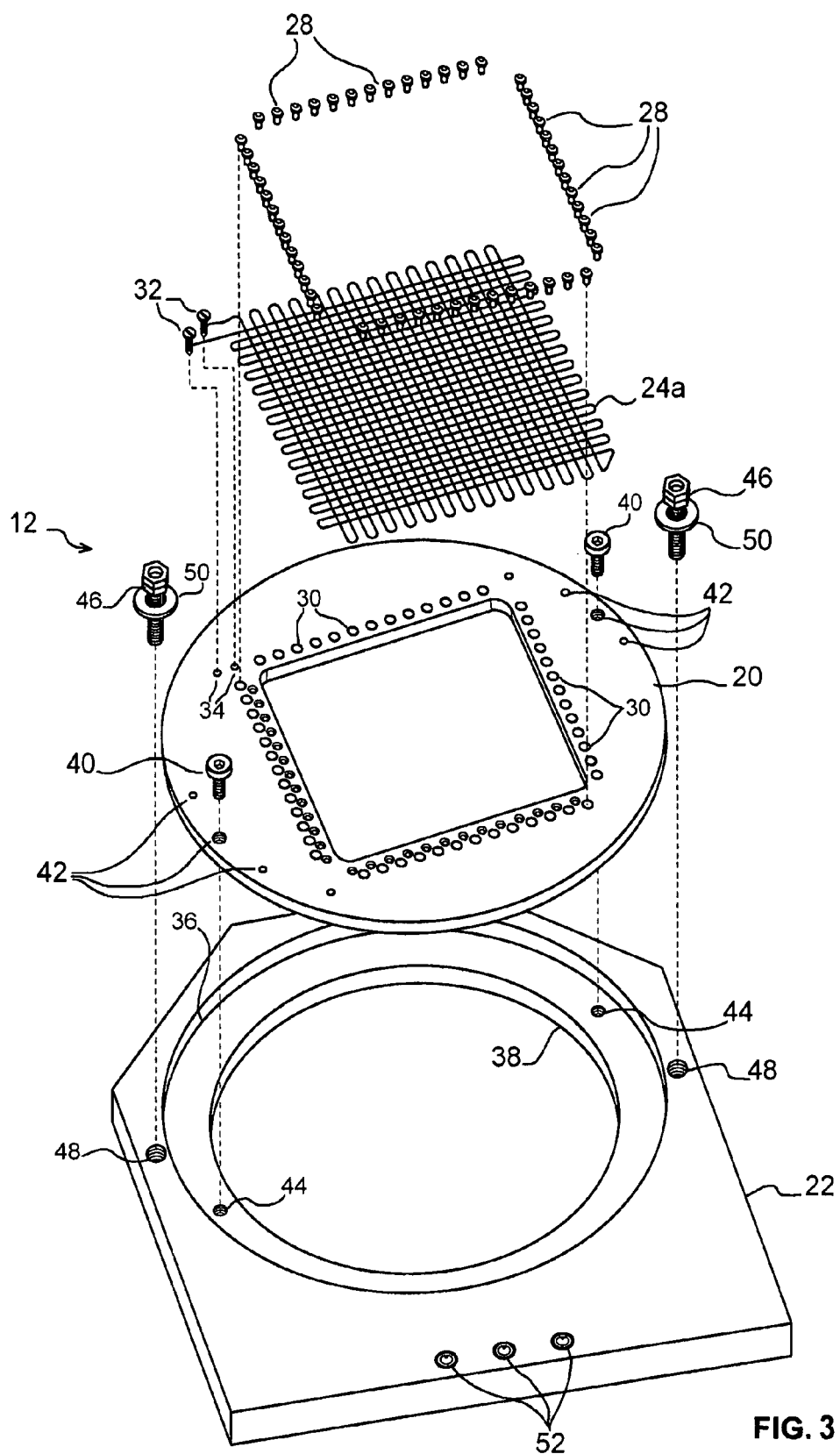
FIG. 3 is an exploded perspective view of the reticulate grid element of FIG. 2.

As shown more clearly in the exploded, perspective view of FIG. 3, the wire 24a is wrapped around a series of screws 28, threadedly received in corresponding threaded openings 30, formed around the perimeter of the opening 26 of the rotatable grid element 20, to provide a grid of horizontally and vertically extending, spaced wire segments. The ends of the wire 24a, are secured by screws 32, threadidly received in corresponding threaded openings 34. The rotatable grid element 20 is rotatably received in a recess 36, formed in and surrounding an opening 38 of the main support plate 22.

Each of a pair of location pins 40 is inserted in a selected one of a series of orientation openings 42 formed around the outer perimeter of the rotatable grid element 20. In this manner, the angular orientation of the wire grid 24, relative to the telescope pupil 14 (see FIG. 1), can be varied. The selection of a particular angular orientation is used to steer the direction of the satellite beams caused by the grid 12. The rotatable grid element 20 is then secured in a selected angular orientation by screwing the location pins 40 into a corresponding threaded opening 44, formed in the recess 36 of the main support plate 22.

Each of a pair of lock-down screws 46 is threadedly received in a corresponding threaded opening 48, formed in the main support structure 22, such that a washer element 50 overlies the rotatable grid element 20 when the element 20 is inserted into the recess 36, to fasten the element 20 to the main support structure 22. A set of openings 52 in the main support plate 22 provides access for mounting screws (not shown) to mount the grid 12 to the telescope, proximate the pupil 14, as shown schematically in FIG. 1.

The reticulate grid formed by the wire 24a is arranged and configured, in terms of wire spacing and wire width, to create satellite beams of the beam of light 10, that provide fiducial spots in the image useful as a surrogate for the corresponding star. For example, in a telescope with a 100 mm (D) pupil of a beam capture minor, a wire spacing (d) for the grid 24 of 5.88 mm will act to create a set of fiducial spots in the image at $17\lambda/D$ along a symmetry axis of the grid in the image plane ($\lambda$=the wavelength of the beam of light 10). To create fiducial spots 10 for astronomical magnitudes fainter, by a factor of 10,000, than the intensity of the star in the image, the wire thickness is set at a wire diameter (g) of 58.8 μm (1/100th the spacing between the wires).

In general, the wire grid design creates fiducial spots on the telescope image, comprising, for example, four brightest spots, spaced equidistant from the imaged star, at a distance from the star $(D/d)(\lambda/D)=\lambda/d$. The fiducial spots are each a satellite of the beam of light corresponding to a star, each having an intensity that is a fraction of the intensity of the imaged star, (the intensity fraction being equal to the ratio $(g/d)^2$). For a more detailed discussion of the theoretical basis for the creation of the fiducial spots, reference is made to "Astrometry And Photometry With Coronagraphs," Anand Sivaramakrishnan and Ben Oppenheimer, The Astrophysical Journal, 647:620-629, Aug. 10, 2006, which is hereby expressly incorporated by reference.

Figure 4:
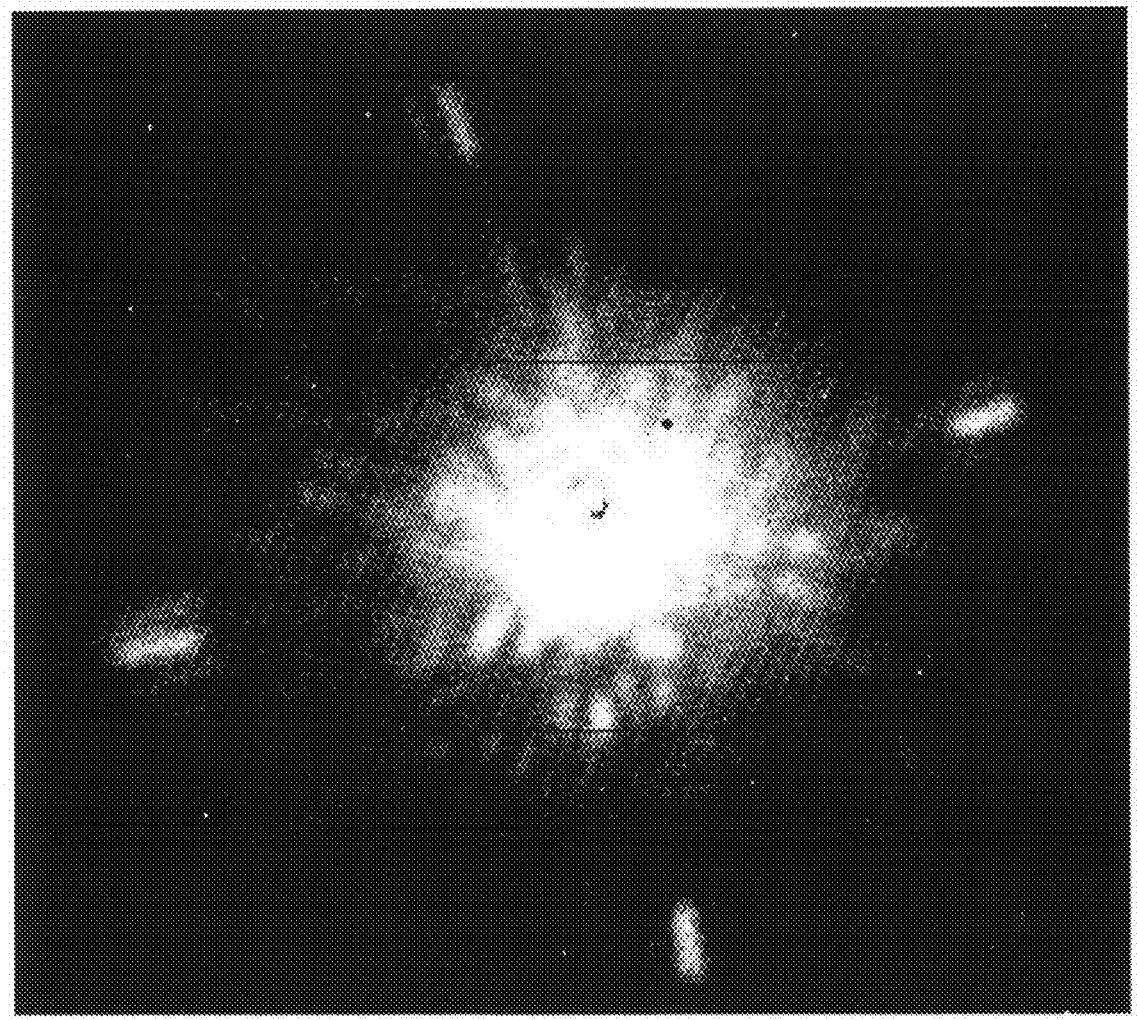
FIG. 4 is an image of a star, with a PSF for the star, and a set of fiducial spots around the PSF, according to a feature of the present invention.

FIG. 4 shows an image of a star, with fiducial spots, as it would appear at the focal plane 16 (see FIG. 1). As can be seen in FIG. 4, a bright PSF image is formed, with the PSF being in the form of a complex arrangement of speckles of light. Moreover, according to a feature of the present invention, a set of four fiducial spots appears around and spaced from the PSF. The fiducial spots appear as elongated stripes because the sample image was taken using a broad-spectrum light. The actual star is located within the complex array of light speckles forming the respective PSF. The set of fiducial spots provided by the reticulate grid 12, is created as a function of, and is, therefor, arranged relative to the respective star obscured by the PSF. Thus, the set of fiducial spots provides an accurate indication of the location of the respective star of the illustrated star image.

Referring once again to FIG. 1, the image formed at the focal plane 16 propagates from point C, diverging to a pupil relay optic 18, from which the light beam 10, and the satellite beams caused by the grid 12, continue to a Lyot pupil and Lyot stop 100 at plane D/E, as is generally known in the art. A re-imaging optic 102 creates the coronagraph by obscuring the PSF as is generally known, but leaving the four fiducial spots created pursuant to a feature of the present invention. The re-imaging optic 102 focuses the coronagraphic image, including the remaining set of fiducial spots created according to a feature of the present invention, at a focal plane F.

With four fiducial spots (as illustrated in FIG. 4) in the field of view, the spots provide most information about the location of the imaged star when they are treated together. Due to spectral smearing in the radial direction, each set of two spots lie on a line intersecting the central star. These two sets of two spots can be used independently to pinpoint the star in each of the two orthogonal kx and ky directions, in the absence of atmospheric differential refraction. In actual data reduction, a line is fit to each set of two radially smeared spots. The fits of these spots can be achieved in a fashion similar to that used for optimal extraction of spectral data from digital images.

The intersection of the two lines from the two sets of fits pinpoints the star for use in an astrometric study. This technique is independent of the spectrum of the star, since for each fit only the shape of the smear PSF in the direction perpendicular to the spectral smear is used. A very low resolution spectrum of the star can be recovered from each observation using the reticulate mask. The ultimate precision of this technique is limited by photon noise. The uncertainty in judging where the center of two radially smeared spots lie (in the direction perpendicular to the spectral bandwidth-induced smearing) is of order the size of the pattern in this direction—viz., a spatial resolution element—divided by the square root of the number of photons in the two satellite images (assuming the spatial resolution element is at least sampled at the Nyquist frequency): $\sigma_x = \lambda_c/D \, [2(g/d)^2 \int_\lambda \lambda Q_\lambda (F^*_\lambda d\lambda/hc)]^{-1/2}$ In the above equation, $F^*_\lambda$ is the stellar spectrum, the detector has a quantum efficiency, $Q_\lambda$, as a function of $\lambda$, h is Planck's constant and c is the speed of light in a vacuum.

In conducting the optimal extraction fits of the smeared spots as described above, a very coarse spectrum of the star is retrieved four times. The spectrum information can be used in a relative photometric study of the imaged star. The sum of the counts in these four spectra is $4(g/d)^2$ multiplied by the stellar intensity (unocculted by the coronagiaphic mask, but including the throughput effects of the coronagraph). The derived intensity can then be used in all images with the reticulate grid in place to calibrate any other object in the field of view, either relative to the primary imaged star, or in an absolute sense if the primary star is well calibrated and measured separately as a flux standard.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An optical device, comprising:
a telescope;
a coronagraph device coupled to the telescope and having a focal plane occulting mask to provide a coronagraphic image; and
a reticulate grid element arranged in a light path propagated through the telescope, at a location relative to the coronagraphic image, to create controlled fiducial spots in the coronagraphic image.

2. The optical device of claim 1 wherein the reticulate grid element comprises a grid of wires.

3. The optical device of claim 2 wherein the grid of wires is secured to a grid element, rotatably mounted in a main support plate.

4. The optical device of claim 3 further comprising location pins arranged and configured to secure the grid element in a preselected angular orientation, relative to the light path.

5. An optical device, comprising:
a mechanism for propagating a beam of light through a path;
a coronagraph device arranged in the light path to provide a coronagraphic image; and
a reticulate grid element arranged prior to the coronagraph device in the light path to create controlled fiducial spots in the coronagraphic image.

6. A method for controlling a beam of light, comprising the steps of:
propagating the beam of light through a reticulate grid; and
thereafter, passing the beam of light through a coronagraph device to provide a coronagraphic image,
the coronagraphic image having controlled fiducial spots.

7. The method of claim 6 wherein the reticulate grid is comprised of grid elements, and wherein the controlled fiducial spots comprise four brightest spots, spaced equidistant from an imaged star, at a distance from the star=$\lambda/d$, each of the fiducial spots being a satellite of the corresponding imaged star, each having an intensity that is a fraction of the intensity of the imaged star, the intensity fraction being equal to the ratio $(g/d)^2$, wherein $\lambda$ is the wavelength of the beam of light, d is the space between grid elements, and g is the diameter of the grid elements.

8. The method of claim 6 comprising the further step of utilizing the created fiducial spots in an astrometric study.

9. The method of claim 6 comprising the further step of utilizing the created fiducial spots in a photometric study.

* * * * *